(12) United States Patent
Christensen

(10) Patent No.: US 8,155,091 B2
(45) Date of Patent: Apr. 10, 2012

(54) BROADCAST ROUTER WITH MULTIPLE EXPANSION CAPABILITIES

(75) Inventor: Carl Christensen, South Jordan, UT (US)

(73) Assignee: Thomson Licensing, Boulogne-Billancourt (FR)

( * ) Notice: Subject to any disclaimer, the term of this patent is extended or adjusted under 35 U.S.C. 154(b) by 1473 days.

(21) Appl. No.: 10/568,035

(22) PCT Filed: Mar. 4, 2004

(86) PCT No.: PCT/US2004/006562
§ 371 (c)(1),
(2), (4) Date: Feb. 10, 2006

(87) PCT Pub. No.: WO2005/020515
PCT Pub. Date: Mar. 3, 2005

(65) Prior Publication Data
US 2008/0155146 A1 Jun. 26, 2008

Related U.S. Application Data

(60) Provisional application No. 60/495,654, filed on Aug. 15, 2003.

(51) Int. Cl.
*H04W 4/00* (2009.01)
(52) U.S. Cl. .......................................... 370/338
(58) Field of Classification Search .................. 370/391, 370/396, 390, 413, 430, 465, 401, 216; 709/224, 709/221, 205, 230, 227, 250, 245, 242; 710/15
See application file for complete search history.

(56) References Cited

U.S. PATENT DOCUMENTS

| | | | | |
|---|---|---|---|---|
| 5,550,815 | A | | 8/1996 | Cloonan et al. |
| 5,802,278 | A | * | 9/1998 | Isfeld et al. ................... 709/249 |
| 6,125,111 | A | * | 9/2000 | Snow et al. .................... 370/360 |
| 6,456,752 | B1 | | 9/2002 | Dragone |
| 6,459,699 | B1 | | 10/2002 | Kimura et al. |
| 6,487,171 | B1 | * | 11/2002 | Honig et al. .................. 370/235 |
| 6,647,010 | B1 | | 11/2003 | Ford et al. |
| 6,754,171 | B1 | * | 6/2004 | Bernier et al. ................ 370/216 |
| 6,826,195 | B1 | * | 11/2004 | Nikolich et al. .............. 370/465 |
| 7,167,479 | B2 | * | 1/2007 | Christensen et al. ......... 370/401 |
| 7,286,565 | B1 | | 10/2007 | Carr |
| 7,408,927 | B2 | * | 8/2008 | George ......................... 370/360 |
| 7,450,560 | B1 | * | 11/2008 | Grabelsky et al. ............ 370/352 |

(Continued)

FOREIGN PATENT DOCUMENTS

JP 3-187661 8/1991

(Continued)

OTHER PUBLICATIONS

Search Report dtd. Sep. 9, 2004.

*Primary Examiner* — Hassan Phillips
*Assistant Examiner* — Prenell Jones
(74) *Attorney, Agent, or Firm* — Robert D. Shedd; Robert B. Levy

(57) ABSTRACT

There is provided a broadcast router that includes at least one chassis adapted for a first, a second, and a third configuration. The first configuration (401 A) includes a plurality of input cards and no output cards. The second configuration (401 B) includes a plurality of output cards and no input cards. The third configuration (400) includes a plurality of input and output cards.

11 Claims, 7 Drawing Sheets

U.S. PATENT DOCUMENTS

| | | |
|---|---|---|
| 2002/0103921 A1 | 8/2002 | Nair et al. |
| 2002/0156940 A1* | 10/2002 | Meyer et al. .................... 710/1 |
| 2003/0033487 A1* | 2/2003 | Pfister et al. .................. 711/144 |
| 2003/0058880 A1* | 3/2003 | Sarkinen et al. .............. 370/413 |
| 2003/0099247 A1* | 5/2003 | Toutant et al. ................ 370/401 |
| 2003/0161303 A1* | 8/2003 | Mehrvar et al. ............... 370/386 |
| 2003/0174701 A1* | 9/2003 | Angle et al. ................... 370/390 |
| 2004/0165584 A1* | 8/2004 | Libeskind ...................... 370/388 |
| 2005/0044284 A1* | 2/2005 | Pescatore ........................ 710/15 |
| 2005/0175017 A1* | 8/2005 | Christensen et al. .......... 370/396 |
| 2005/0198261 A1* | 9/2005 | Durvasula et al. ............. 709/224 |

FOREIGN PATENT DOCUMENTS

| | | |
|---|---|---|
| JP | 10-308748 | 11/1998 |
| JP | 10-308748 A | 11/1998 |
| JP | 11-331202 | 11/1999 |
| JP | 2000-252635 A | 9/2000 |
| JP | 2000-341359 A | 12/2000 |
| JP | 2001-197156 A | 7/2001 |
| JP | 2001-285310 | 10/2001 |
| JP | 2002-057719 | 2/2002 |
| JP | 2002-191061 A | 7/2002 |
| JP | 2002-344514 | 11/2002 |

* cited by examiner

BROADCAST ROUTER WITH MULTIPLE EXPANSION CAPABILITIES

This application claims the benefit, under 35 U.S.C. §365 of International Application PCT/US04/06562, filed Mar. 4, 2004 which was published in accordance with PCT Article 21(2) on Mar. 3, 2005 in English and which claims the benefit of U.S. provisional patent application No. 60/495,654, filed Aug. 15, 2003.

BACKGROUND OF THE INVENTION

1. Field of the Invention

The present invention generally relates to routers and, more particularly, to a broadcast router with multiple expansion capabilities.

2. Background of the Invention

In conventional linearly expandable broadcast router architectures, each chassis includes both input cards and output cards. A broadcast router allows each one of a plurality of outputs there from to be assigned a signal from any one of a plurality of inputs thereto. For example, an N×M broadcast router has N inputs and M outputs coupled together by a routing engine that allows any one of the N inputs to be applied to each one of the M outputs.

Broadcast router configurations can vary widely, for example, it can require few inputs and but many outputs, many inputs and few outputs, or approximately equal inputs and outputs.

Linearly expandable routers allow users to start with a smaller router and enlarge it later by adding more chassis and connecting the chassis. Supporting a wide range of differences between number of inputs and outputs and linear expansion will result in configurations where large portions of the chassis are empty.

Accordingly, it would be desirable and highly advantageous to have a broadcast router with multiple expansion capabilities.

SUMMARY OF THE INVENTION

The problems stated above, as well as other related problems of the prior art, are solved by the present invention, a broadcast router with multiple expansion capabilities.

According to an aspect of the present invention, there is provided a broadcast router that includes at least one chassis adapted for a first, a second, and a third configuration. The first configuration includes a plurality of input cards and no output cards. The second configuration includes a plurality of output cards and no input cards. The third configuration includes a plurality of input and output cards.

These and other aspects, features and advantages of the present invention will become apparent from the following detailed description of preferred embodiments, which is to be read in connection with the accompanying drawings.

DETAILED DESCRIPTION OF THE INVENTION

The present invention is directed to a broadcast router with multiple expansion capabilities. The present invention advantageously allows for more optimal use of the chassis of the broadcast router in various configurations. That is, the present invention provides a broadcast router that allows the same chassis to be used for two different linearly expandable router systems, resulting in three possible configurations.

In the first system, a broadcast router chassis includes either input cards (first configuration) or output cards (second configuration), but not both. Thus, at least two chassis are required to form the second system. In the second system, a broadcast router chassis includes the same number of input and output cards (third configuration). Systems that include more input chassis than output chassis are supported by the present invention, as well as systems that include more output chassis than input chassis. The first system can be used to build larger systems, from the same chassis with the same number of expansion ports.

It is to be understood that the present invention may be implemented in various forms of hardware, software, firmware, special purpose processors, or a combination thereof. Preferably, the present invention is implemented as a combination of hardware and software.

It is to be further understood that, because some of the constituent system components depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
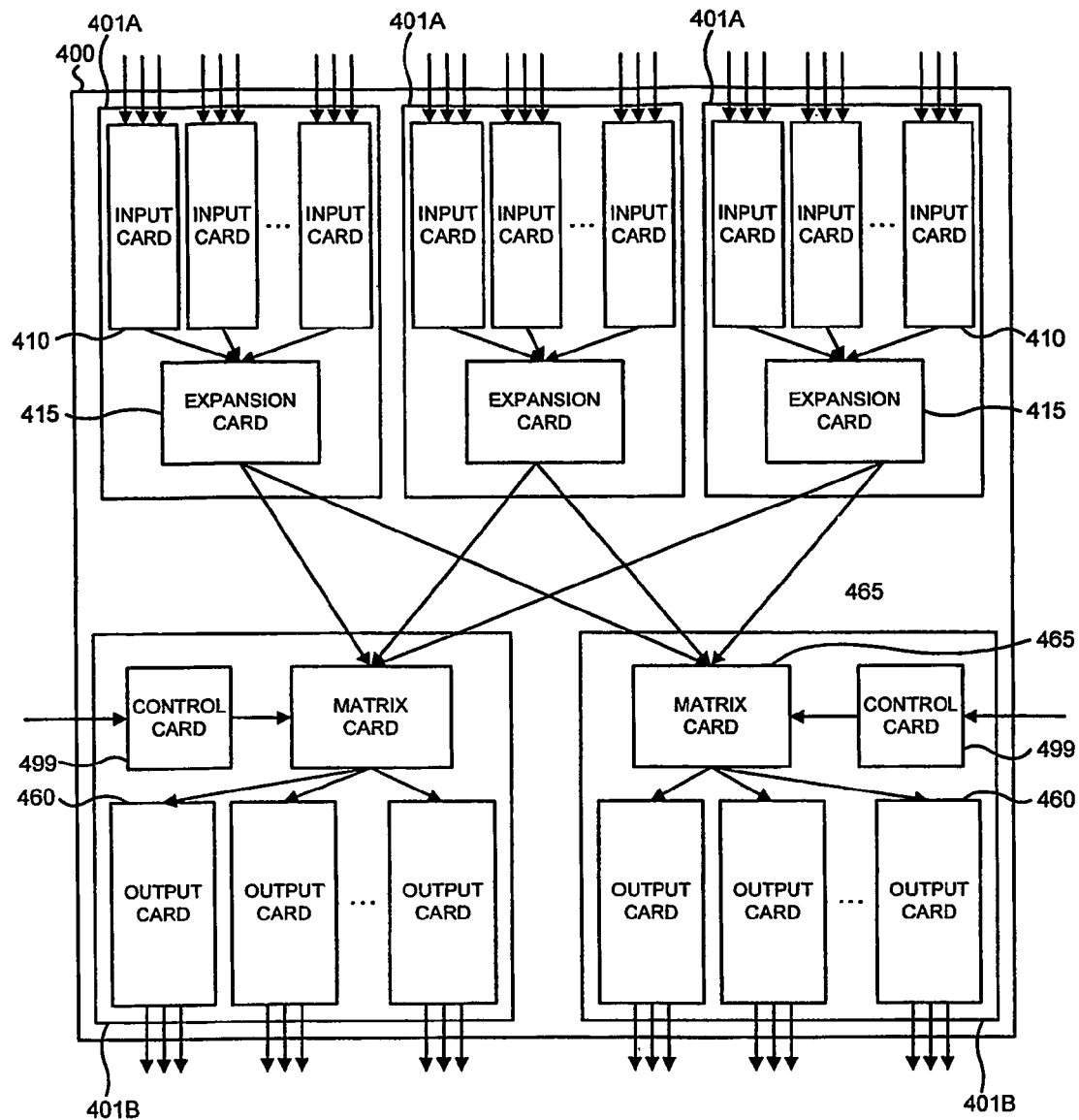
FIG. 1 is a block diagram illustrating a broadcast router 400, according to an illustrative embodiment of the present invention.

FIG. 1 is a block diagram illustrating a broadcast router 400, according to an illustrative embodiment of the present invention.

The broadcast router 400 includes five chassis, each of the five chassis being capable of being configured in a first, a second, and a third configuration. All of the chassis shown in the Figures herein will be generally identified by a reference numeral 401. The reference numeral 401 will be followed by one of the letters A, B, or C, depending upon whether the particular chassis being referred to is in one of the first, the second, or the third configuration, respectively.

In the first configuration, the chassis 401A includes a plurality of input cards (hereinafter "input cards") 410 and no output cards. In the second configuration, the chassis 401B includes a plurality of output cards (hereinafter "output cards") 460 and no input cards. In the third configuration (see FIG. 4), the chassis includes a plurality of input cards and output cards. In the illustrative embodiment of FIG. 1, the three chassis 401A shown at the upper portion of FIG. 1 are configured in the first configuration (input cards, but no output cards), and the two chassis 401B shown at the lower portion of FIG. 1 are configured in the second configuration (output cards, but no input cards). However, it is to be appreciated that the present invention may be employed to form a broadcast router having multiple expansion capabilities such that many configurations other than those shown in the Figures herein may be readily implemented by one of ordinary skill in the related art, while maintaining the spirit of the present invention.

It is to be appreciated that when a particular chassis is configured in either of the first configuration or the second configuration, another corresponding chassis will be present in the router that is configured for the alternate configuration. That is, for each chassis configured in the first configuration, the broadcast router will include another chassis (or more than one) that is configured in the second configuration; also, for each chassis configured in the second configuration, the broadcast router will include another chassis (or more than one) configured in the first configuration. In this way, data may be both input to and output from the broadcast router. In the event that a particular chassis is configured in the third configuration, then another chassis may or may not be required, as data is capable of both being input to and output from a broadcast router having only one chassis (or more than one) configured in the third configuration.

It is to be further appreciated that in the first configuration, each such chassis 401A may also include an expansion card 415, in addition to the input cards 410.

The input cards 410 receive input streams and "condition" the input streams for transmission through the broadcast router 400. The types of signal conditioning operations to be performed on the input stream will vary depending on the signal type to be conditioned. For example, some of the types of signal conditioning that may be employed include, but are not limited to, decoding, re-clocking, amplitude amplification, and so forth.

The expansion card 415 receives the streams from the input cards 410 and arranges the streams in time division multiplexed streams for transmission to at least one other chassis (the at least one other chassis being configured in the second configuration, such as chassis 401B). It is to be appreciated that the present invention is not limited to time division multiplexing by the expansion card to arrange the streams and, thus, other data arranging schemes may also be employed while maintaining the spirit of the present invention. It is to be further appreciated that the expansion stream for the second configuration should preferably have twice the amount of bandwidth available as the expansion stream for the first configuration or, alternatively, the first configuration could employ twice the amount of bandwidth. The increased bandwidth may be obtained, for example, by a higher bandwidth/clock speed on the expansion cards or physically more wires in the connector, and so forth. It would also be possible to decrease the maximum speed of incoming signals in the second configuration if the expansion card is not capable of the higher throughput needed in the first configuration. Given the teachings of the present invention provided herein, one of ordinary skill in the related art will contemplate these and various other configurations of the present invention while maintaining the spirit of the present invention.

It is to be yet further appreciated that in the second configuration, each such chassis 401B may also include a matrix card 465, in addition to the output cards 460.

The matrix card 465 receives the time-multiplexed streams from at least one other chassis (the at least one other chassis being configured in the first configuration, such as chassis 401A) and routes the streams to the appropriate output cards 460.

The output cards 460 receive the streams from the matrix card 465 and prepare the streams for transmission (e.g., on the outputs of the broadcast router 400). Preparation of the streams may involve signal conditioning, conversation of the data within parameters of a pre-specified protocol, and so forth.

In the illustrative embodiment of FIG. 1, a control card 499 is shown and described with respect to the chassis 401B configured in the second configuration. However, it is to be appreciated that the control card may be employed with respect to a chassis configured in any one of the first, the second, and the third configurations.

The control card 499 interfaces support protocols with the chassis in which it is included for changing the input/output assignments of the broadcast router 400. It is to be appreciated that the functions performed by the control card 499 may be optionally subsumed by and integrated with the expansion card 415 and/or the matrix card 465, depending upon a current configuration of the chassis in which the control card is included.

For each chassis 401A configured in the first configuration, the input cards 410 of that chassis 401 receive and decode a number of incoming input streams (hereinafter "data"), and then output the data to the expansion card 415. For each chassis 401A configured in the first configuration, the expansion card 415 of that chassis 401 receives all of the data from all of the input cards 410 in that chassis 401A and transfers the data to all of the chassis 401B configured in the second configuration.

For each chassis 401B configured in the second configuration, the matrix card 465 receives the data from all of the chassis 401A in the first configuration and routes the data to the output cards 460. The output cards 460 recreate the associated input stream that was input to the broadcast router 400 on the outputs of the broadcast router 400.

It is to be appreciated that a chassis configured in the third configuration will include the elements described above such that the input 410 and output cards 460 (as well as the expansion card 415, the matrix card 465, and optionally the control card 499) will both be present in such a chassis.

Figure 2:
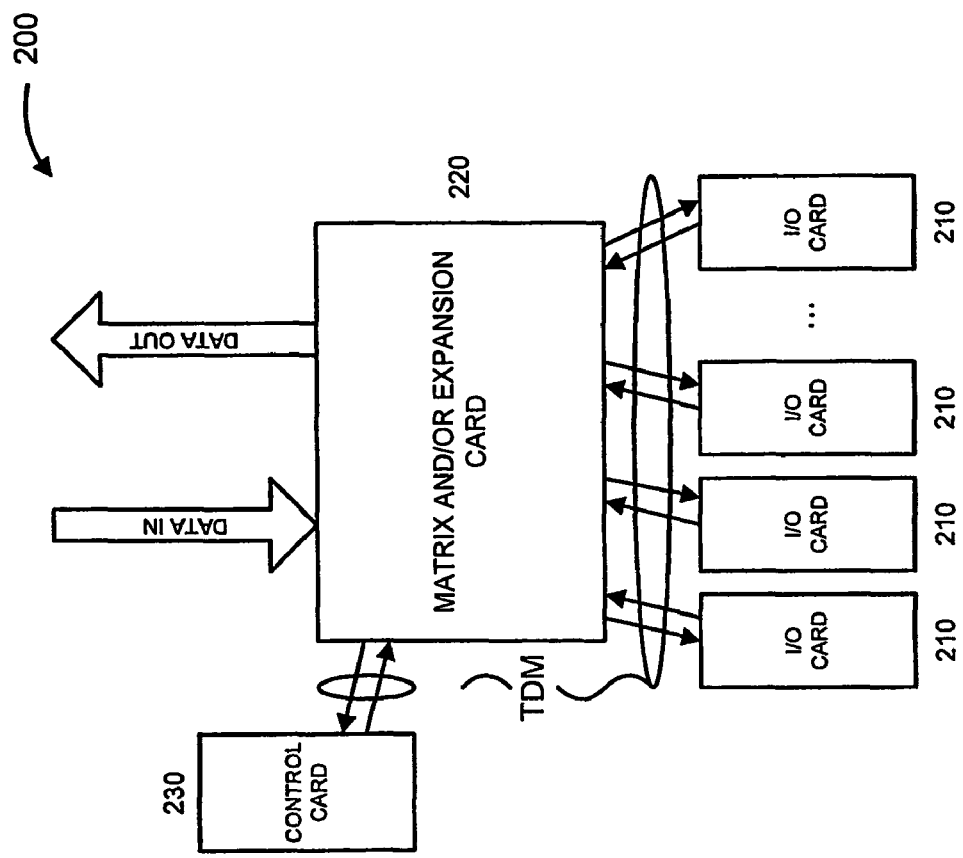
FIG. 2 is a diagram illustrating a broadcast router chassis 200, according to an illustrative embodiment of the present invention.

FIG. 2 is a diagram illustrating a broadcast router chassis 200, according to an illustrative embodiment of the present invention.

The broadcast router chassis 200 includes a plurality of I/O cards 210. It is to be appreciated that the I/O cards may include input cards but no output cards (first configuration), output cards but no input cards (second configuration), or an equal combination thereof (third configuration), depending on a current configuration of the broadcast router chassis 200. That is, as used herein, the phrase "I/O cards" encompasses, inter alia, the situation when either input cards or output cards, but not both, are present in a particular chassis.

The broadcast router chassis 200 further includes a matrix and/or expansion card 220. That is, the functions of the matrix and expansion cards may be implemented in a single card, or may be implemented separately.

The broadcast router chassis 200 further includes a control card 230.

Time division multiplexing (TDM) is used for communication between the plurality of I/O cards 210 and the matrix and/or expansion card 220, and also between the control card 220 and the matrix and/or expansion card 220. That is, TDM data paths are included to and from each slot to the matrix/expansion slot. In addition to transferring data, these TDM data paths may also be used for transferring commands, status, and system health monitoring information throughout the chassis 200.

Figure 3:
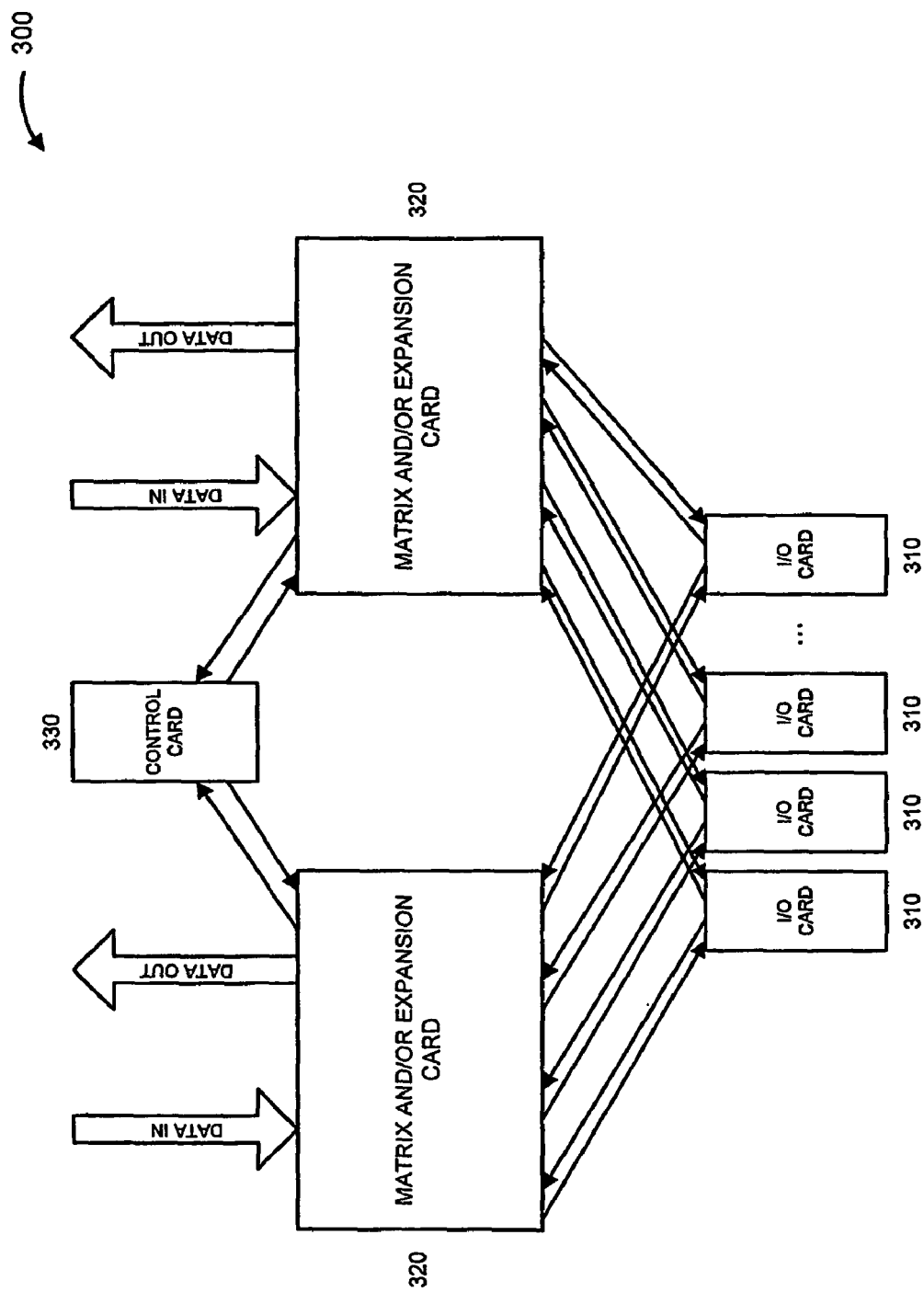
FIG. 3 is a diagram illustrating a broadcast router chassis having redundancy features, according to an illustrative embodiment of the present invention.

FIG. 3 is a diagram illustrating a broadcast router chassis 300 having redundancy features, according to an illustrative embodiment of the present invention.

The broadcast router chassis 300 includes a plurality of I/O cards 310. It is to be appreciated that the plurality of I/O cards 310 may include input cards but no output cards (first configuration), output cards but no input cards (second configuration), or an equal combination thereof (third configuration), depending on a current configuration of the broadcast router chassis 300. That is, as used herein, the phrase "I/O cards" encompasses, inter alia, the situation when either input cards or output cards, but not both, are present in a particular chassis.

The broadcast router chassis 300 further includes a control card 330 and two matrix and/or expansion cards 320. It is to be appreciated that the use of two matrix and/or expansion cards 320 allows for redundancy in the routing of the data within the broadcast router chassis 300, thereby providing a more robust system than that provided by the prior art.

Figure 4:
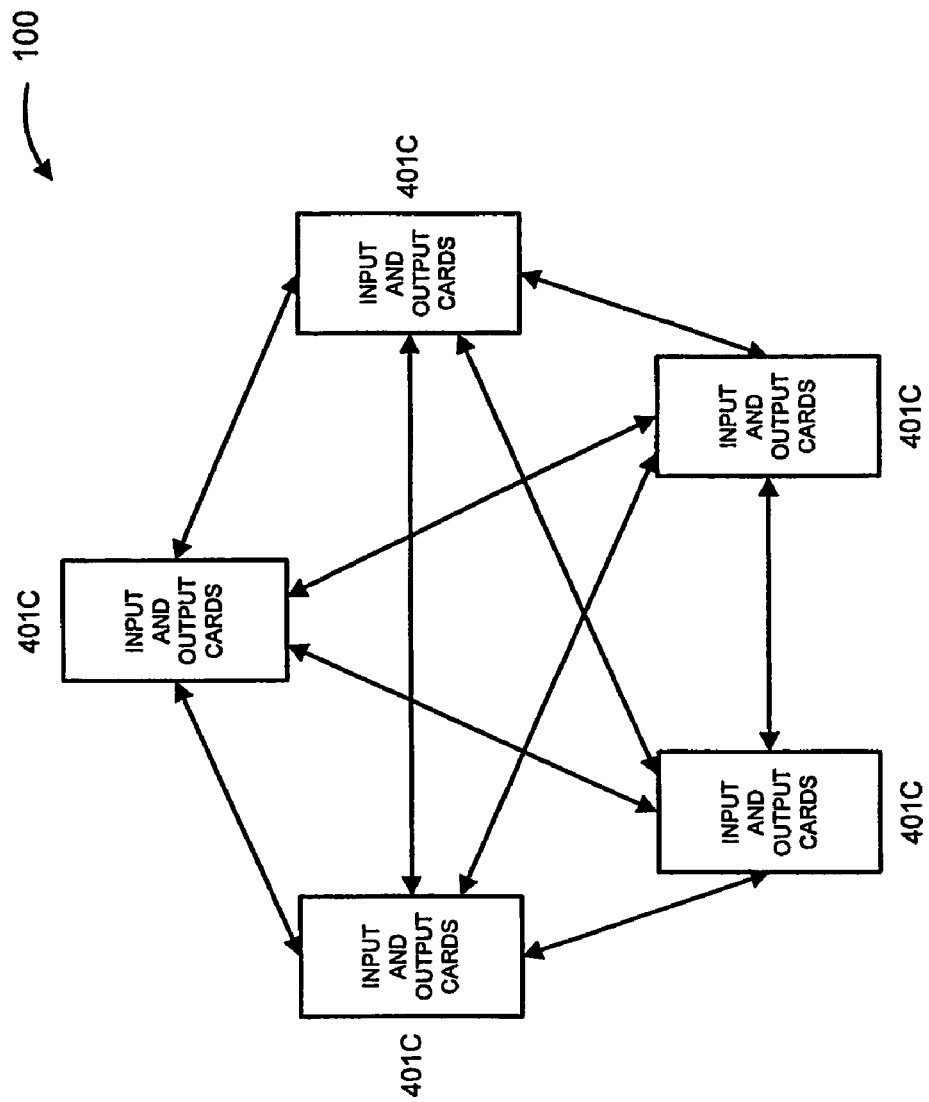
FIG. 4 is a diagram illustrating a broadcast router architecture 100 that includes chassis 401 having both input and output cards included therein, according to an illustrative embodiment of the present invention.

FIG. 4 is a diagram illustrating a broadcast router architecture 100 that includes a plurality of chassis 401C, each having both input and output cards included therein, according to an illustrative embodiment of the present invention. That is, each of the plurality of chassis 401C depicted in FIG. 1 is configured in the third configuration.

Figure 5:
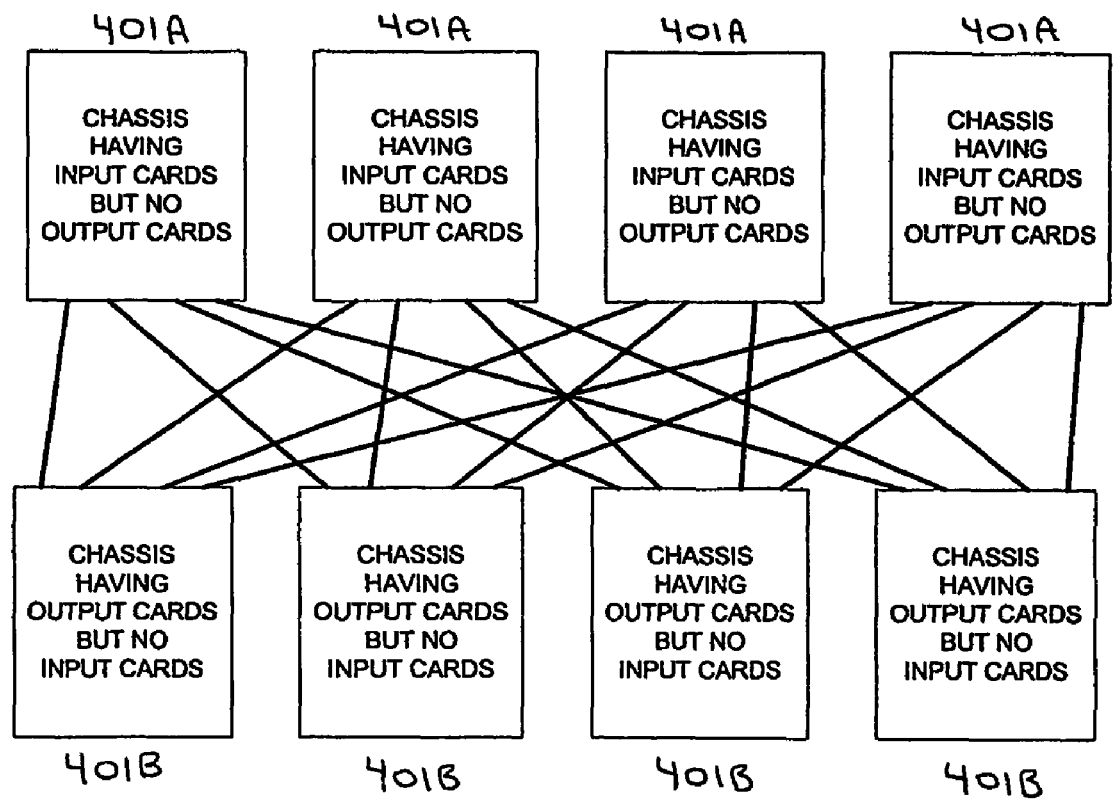
FIG. 5 is a diagram illustrating a broadcast router architecture 500 that is configured with the same number of inputs and outputs, according to an illustrative embodiment of the present invention.
Figure 6:
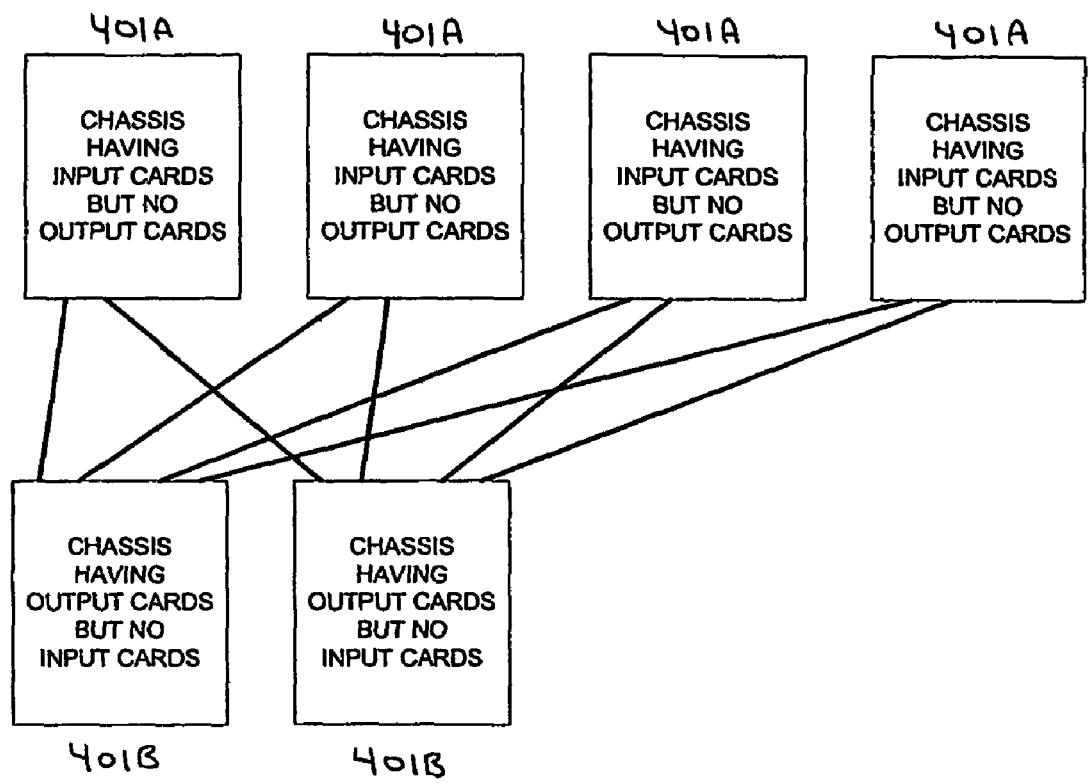
FIG. 6 is a diagram illustrating a broadcast router architecture 600 that is configured with many more inputs than outputs, according to another illustrative embodiment of the present invention.
Figure 7:
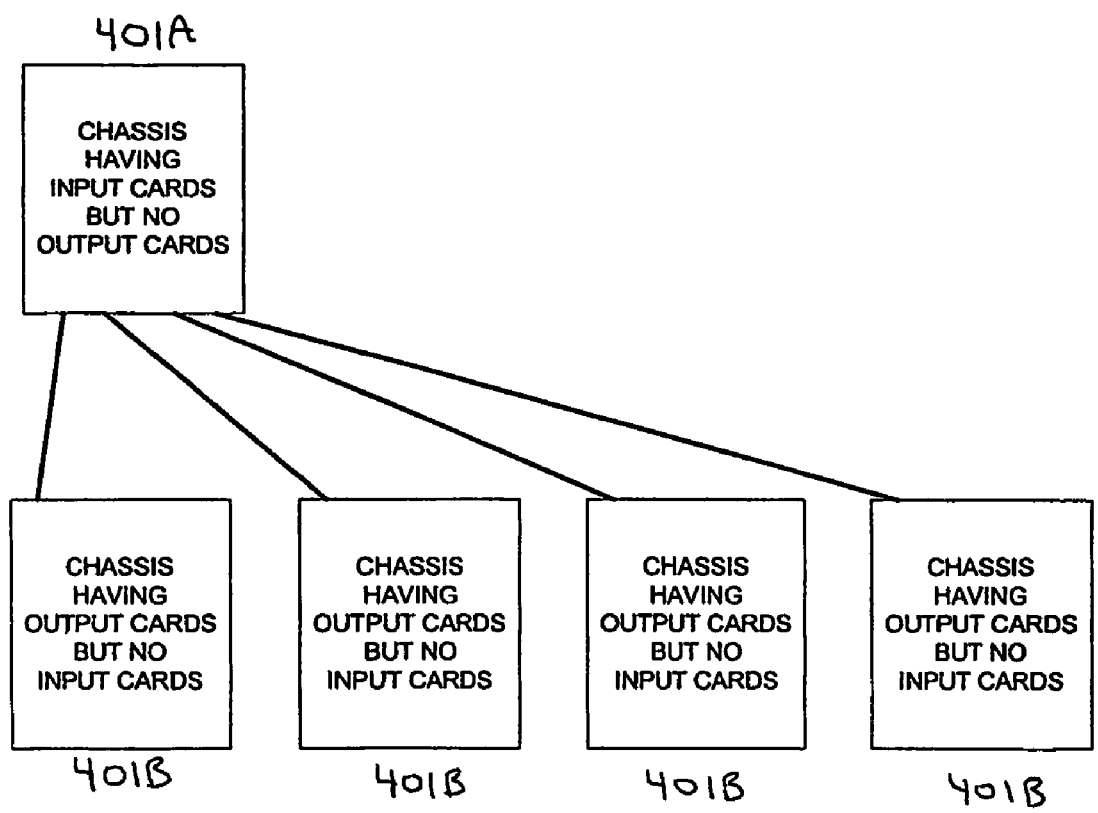
FIG. 7 is a diagram illustrating a broadcast router architecture 700 that is configured with many more outputs than inputs, according to yet another illustrative embodiment of the present invention.

FIG. 5 is a diagram illustrating a broadcast router architecture 500 that is configured with the same number of inputs and outputs, according to an illustrative embodiment of the present invention. FIG. 6 is a diagram illustrating a broadcast router architecture 600 that is configured with many more inputs than outputs, according to another illustrative embodiment of the present invention. FIG. 7 is a diagram illustrating a broadcast router architecture 700 that is configured with many more outputs than inputs, according to yet another illustrative embodiment of the present invention.

Each of the chassis 401A shown in FIGS. 5-7 includes input cards (and an expansion card (not shown) and optionally a control card), but does not include any output cards. Each of the chassis 401B shown in FIGS. 5-7 includes output cards (and a matrix card (not shown) and optionally a control card), but does not include any input cards.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

The invention claimed is:

1. A broadcast router, comprising:
at least one first chassis, having one of a first, and a second, configuration, the first configuration including a plurality of input cards and no output cards, and the second configuration including a plurality of output cards and no input cards, and at least a second chassis, having one of the second configuration and first configuration when the first chassis has the first and second configuration, respectively.

2. The broadcast router of claim 1, wherein the plurality of input cards are for initially receiving data into the broadcast router, and the first configuration of the at least one chassis further includes an expansion card (220) for respectively receiving the data from the plurality of input cards and arranging the data for transfer.

3. The broadcast router of claim 2, further including a control card to change input/output assignments.

4. The broadcast router of claim 2, further including an expansion card that arranges the data using time division multiplexing.

5. The broadcast router of claim 4, wherein the expansion card has a bandwidth sufficient for supporting both the first configuration and the second configuration.

6. The broadcast router of claim 4, wherein the expansion card has a bandwidth modifiable to support any one of the first configuration, and the second configuration.

7. The broadcast router of claim 1, wherein the second configuration of the first chassis further includes a matrix card for receiving the data from the second chassis and for routing the data to appropriate ones of the plurality of output cards.

8. The broadcast router of claim 7, wherein the plurality of output cards are for respectively receiving the data from the matrix card and for outputting the data external to the broadcast router.

9. The broadcast router of claim 7, further including a control card to change input/output assignments.

10. The broadcast router of claim 7, wherein the matrix card conditions the data prior to outputting the data.

11. The broadcast router of claim 1, wherein each chassis further comprises a control card to change input/output assignments of the data.

* * * * *